United States Patent [19]

Hartman et al.

[11] Patent Number: 5,552,163

[45] Date of Patent: Sep. 3, 1996

[54] GUM BASE IN CHEWING GUM HAVING IMPROVED COMPATIBILITY AND FLAVOR

[75] Inventors: Scott E. Hartman, Roosevelt; Archie L. Hightower, Plainfield, both of N.J.

[73] Assignee: Wm. Wrigley Jr. Company, Chicago, Ill.

[21] Appl. No.: 435,672

[22] Filed: May 5, 1995

Related U.S. Application Data

[63] Continuation-in-part of Ser. No. 405,344, Mar. 16, 1995, abandoned.

[51] Int. Cl.⁶ .................................................. A23G 3/30
[52] U.S. Cl. .................................................. 426/3; 426/662
[58] Field of Search .................................. 426/3–6, 662

[56] References Cited

U.S. PATENT DOCUMENTS

| | | | |
|---|---|---|---|
| 3,031,881 | 1/1967 | Davis | 426/662 |
| 3,573,933 | 4/1971 | MacLeod | 426/3 |
| 3,974,293 | 8/1976 | Witzel | 426/4 |
| 3,995,064 | 11/1976 | Ehrgott et al. | 426/3 |
| 4,065,579 | 12/1977 | Mackay et al. | 426/3 |
| 4,187,320 | 2/1980 | Koch et al. | 426/3 |
| 4,224,345 | 9/1980 | Tezuka et al. | 426/3 |
| 4,241,091 | 12/1980 | Stroz et al. | 426/4 |
| 4,248,894 | 2/1981 | Mackay et al. | 426/3 |
| 4,352,823 | 10/1982 | Cherukuri et al. | 426/5 |
| 4,452,820 | 6/1984 | D'Amelia et al. | 426/3 |
| 4,479,977 | 10/1984 | Dashiell et al. | 426/609 |
| 4,698,223 | 10/1987 | Perfetti et al. | 426/4 |
| 4,737,295 | 4/1988 | Cowan et al. | 252/8.515 |
| 4,794,000 | 12/1988 | Ecanow | 424/457 |
| 4,794,003 | 12/1988 | Cherukuri et al. | 426/6 |
| 4,853,465 | 8/1989 | Cowan et al. | 530/506 |
| 4,863,980 | 9/1989 | Cowan et al. | 525/54.31 |
| 4,872,884 | 10/1989 | Cherukuri et al. | 426/3 |
| 4,915,958 | 4/1990 | Faust et al. | 426/3 |
| 4,956,104 | 9/1990 | Cowan et al. | 252/8.551 |
| 4,963,367 | 10/1990 | Ecanow | 424/485 |
| 4,975,287 | 12/1990 | Zibell et al. | 426/3 |
| 5,045,593 | 9/1991 | Cowan et al. | 525/54.3 |
| 5,087,459 | 2/1992 | Chuu et al. | 426/4 |
| 5,110,607 | 5/1992 | Yang | 426/3 |
| 5,340,598 | 8/1994 | Hay, Jr. et al. | 426/496 |
| 5,362,494 | 11/1994 | Zysman et al. | 424/401 |

FOREIGN PATENT DOCUMENTS

0566174A1  10/1993  European Pat. Off. .

*Primary Examiner*—Jeanette Hunter
*Attorney, Agent, or Firm*—Hill, Steadman & Simpson

[57] ABSTRACT

Improved gum base and chewing gum made therefrom. The gum base includes non-soy lecithin. The non-soy lecithin may be either in a liquid state or powder form.

20 Claims, No Drawings

GUM BASE IN CHEWING GUM HAVING IMPROVED COMPATIBILITY AND FLAVOR

RELATED APPLICATIONS

This patent application is a continuation-in-part of U.S. patent application Ser. No. 08/405,344 filed on Mar. 16, 1995, now abandoned.

BACKGROUND OF THE INVENTION

The present invention relates generally to chewing gums and methods of making same. More specifically, the present invention relates to chewing gum bases and chewing gums made therefrom.

Chewing gum compositions typically comprise a water soluble bulk portion, a water insoluble chewable gum base portion, and flavoring agents. The water soluble portion dissipates with the flavoring agent over a period of time during chewing. The gum base portion is retained in the mouth throughout the chew.

The chewing gum base can include a number of ingredients. One ingredient that is typically used in chewing gum base is lecithin. In gum base, the lecithin acts as an emulsifier, softener, mouth texturizer, moisture retainer, stabilizer, and flavor sensory enhancer.

When used as an emulsifier, lecithin allows fats and oils to be added to the base more easily and allows same to be blended into other gum ingredients that may be present therein, such as polyvinyl acetate. This allows the resultant gum base to be more homogeneous.

As a mouth texturizer, lecithin imparts a smooth mouth feel in chewing gums made with lecithin containing bases. Flavor sensory perception is also enhanced in chewing gums made with lecithin containing bases by a pleasant feeling to the mouth and tongue.

The term lecithin, from a true chemical sense, refers to phosphatidyl choline. However, as used by suppliers of "lecithin" it refers to a brown liquid oil product or a de-oiled, powder product, derived from vegetables, e.g., corn, or beans, e.g., soy, that includes in addition to phosphatidyl choline: phosphatidyl ethanolamine; phosphatidyl inositol; phosphatidic acid; phosphatidyl serine; glycolipids; and other components. The amount of phosphatides in typically supplied lecithin oil is approximately 35% to about 65% by weight.

The use of lecithin in gum base, and in a chewing gum made from a lecithin-containing base, can create discoloration problems. In this regard, in a lecithin gum base, browning is a function of temperature and time and can occur when the manufacturing and holding temperature of the gum base exceeds 180° F. for over an 8 hour period. Although, typically gum bases are manufactured within a 2 to 3 hour period at 200° to 220° F., at the chewing gum factory, gum base can be held for up to 18 hours at 200° to 230° F.

Another issue with typically supplied lecithin is that it typically causes the chewing gum to have poor taste. Specifically, lecithin, when used in chewing gum including mint flavor, causes poor mint sensations, e.g., reduced mint flavor and cooling sensation.

As noted above, lecithin provides many beneficial characteristics to chewing gum when used in a gum base. Attempts at replacing lecithin with other ingredients is possible, however, effects to flavor perception and mouth feel may be noticed. For example, attempting to replace lecithin with fats and oils will result in a chewing gum having reduced flavor and mouth feel.

It is therefore desirable to provide a base that includes the characteristics provided by lecithin, but, that does not discolor.

SUMMARY OF THE INVENTION

The present invention provides an improved chewing gum base, and chewing gum that contains the chewing gum base, that includes a non-soy based lecithin.

In an embodiment, a non-soy liquid lecithin is used in a gum base. In a further embodiment, the non-soy lecithin, which may be either liquid or powdered, is utilized in a gum base that includes wax having alkanes that predominantly have a carbon length greater than 30.

To this end, in an embodiment, the present invention provides a gum base comprising a non-soy liquid lecithin composition.

In an embodiment, non-soy liquid lecithin comprises approximately 1 to about 13 by weight of the composition.

In an embodiment, non-soy powdered lecithin comprises approximately 0.1% to that 6% by weight of the composition.

In an embodiment, the base includes non-soy powdered lecithin.

In an embodiment, the non-soy lecithin includes corn or palm oil.

In an embodiment, the non-soy lecithin does not include phosphatidyl ethanolamine.

In an embodiment, the non-soy lecithin includes a modified phosphatide.

The non-soy lecithin includes a modified phosphatide having the structure:

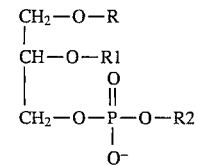

wherein

R= a fatty acid

R1= a fatty acid or an optional side-chain identical to the structures of any R2

R2= a primary side-chain the same as or different from R1 and having a structure:

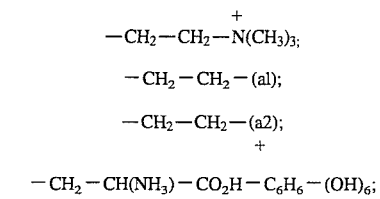

and

—H; and wherein a1 and a2 are secondary, tertiary or quaternary amines of the optional and primary side chains R1 and R2, respectively, a1 and a2 each having identical or different structures from one another, the structures being one or more of

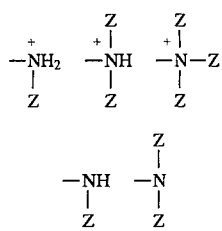

wherein each Z is one or more substituted side chains that is the same as or different from each other, the side chains being other than —CH₃ and $$-\overset{O}{\underset{\|}{C}}-O$$

and being side chains that inhibit a carbonyl reaction of a saccharide to an amine.

In an embodiment, the gum base includes at least one softener chosen from the group consisting of monohydrogenated, partially hydrogenated, and fully hydrogenated glycerides chosen from the group consisting of cottonseed, palm, palm kernel, coconut, safflower, and tallow.

In an embodiment, the gum base includes at least one wax having a number average molecular weight of at least 600 and a viscosity of at 10 mm²/s.

In another embodiment, a gum base is provided comprising: a wax compound that comprises less than 50% alkanes having a carbon length of less than C-30; and non-soy lecithin.

In an embodiment, the non-soy lecithin is powdered.

In a still further embodiment, a method for improving flavor in a chewing gum is provided comprising the steps of manufacturing chewing gum from a gum base that includes lecithin but does not include soybean oil.

It is an advantage of the present invention to provide an improved gum base.

Still further, an advantage of the present invention is to provide an improved chewing gum composition.

Furthermore, an advantage of the present invention is to provide a gum base that has improved flavor characteristics.

Moreover, an advantage of the present invention is to provide the use of non-soy lecithin that can be used alone or blended with other ingredients suitable for use in base in order to accommodate variable processing requirements.

Further, an advantage of the present invention is to provide a gum base including non-soy lecithin and softeners that are not derived from soy bean.

Additionally, an advantage of the present invention is to provide a gum base having improved compatibility and containing an effective combination of wax as for use with non-soy lecithin.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an improved chewing gum base and resultant chewing gum. To this end, the present invention provides a chewing gum base comprising a non-soy lecithin.

As used herein, "lecithin" is used in its common, commercial sense and includes phosphatides, emulsifying or suspending oils, and may have other components present such as carbohydrates, saccharides, and/or fats.

As used herein, "non-soy lecithin" refers to lecithin, as that term is used above, that does not include soybean oil and if it includes oil comprises as the suspension oil, vegetable oils not derived from soybean. Since typical lecithin oil has soy oil, this lecithin may be a powder when it is in the non-soy state. However, the non-soy lecithin may also be in an oily, viscous state wherein the lecithin comprises vegetable oils other than soybean, e.g., corn or palm.

"Non-soy liquid lecithin" refers to non-soy lecithin, as that term is defined above, that does not contain soy oil, but does include a suspension oil, such as vegetable oil not derived from soybean. Non-soy liquid lecithin does not refer to powder lecithin that is mixed with a triglyceride, such as medium chain triglycerides, prior to, or during, incorporation into a gum base.

Due to the use of the non-soy lecithin of the present invention, improved flavor is achieved because the lecithin does not include soy oil. It has been discovered that soy oils can adversely effect the flavor profiles of some gums made from respective gum bases. Therefore, the removal of soy oil improves the flavor.

Additionally, due to the use of non-soy lecithin in a wax containing gum base, improved compatibility is achieved. Specifically, with respect to the use of non-soy powdered lecithin, improved compatibility is achieved via the phosphatide emulsifying effect of non-soy powdered lecithin and a reduction of oil added in the base (from a removal of the oil present in the lecithin). This compatibility may be even greater if, as discussed in detail below, preferred waxes are used. It should be noted, however, that compatibility may be maximum in a wax-free base utilizing the non-soy lecithin of the present invention.

Pursuant to the present invention, the non-soy lecithin may either be "powdered" or "liquid." As noted above, "liquid" refers to non-soy lecithin that includes a suspension oil. "Powdered" refers to non-soy lecithin wherein effectively all of the oils have been removed.

As a powder, the non-soy lecithin can be added in its powdered form directly to gum base. However, at times it may be beneficial or desirable to pre-mix non-soy powdered lecithin, with non-soy based oils, and then add the pre-mix to the base.

In an embodiment, the non-soy lecithin is added to the gum base so it comprises approximately 0.1 to about 13% by weight of the base. If the non-soy lecithin is a powdered lecithin, less lecithin should be used. In this regard, preferably, for a non-soy powdered lecithin, approximately 0.1 to about 6% by weight of the base is used. For a non-soy liquid lecithin approximately 1 to about 13% by weight of the base should be the lecithin.

The non-soy lecithin may be, if desired, a modified lecithin. In this regard, the non-soy lecithin may include a modified phosphatide as is discussed in detail below.

With respect to the wax component of the gum base, as noted above, non-soy lecithin may have especially advantageous properties. However, as noted above, the non-soy lecithin can be used in wax-free gum bases.

Wax is composed of mainly straight-chained normal alkanes and branched iso-alkanes. The ratio of normal alkanes to iso-alkanes varies.

The branched chains and ring structures are located randomly along the carbon chain in those waxes that are predominantly iso-alkanic. The branched chains and ring structures are located near the end of the chain for those waxes that are predominantly normal-alkanic.

The normal alkanic waxes typically have carbon chain lengths >C-18 but the lengths are not predominantly greater than C-30. The viscosity of normal alkanic waxes is <10 mm$^2$/s and the combined number average molecular weight is <600 MW.

On the other hand, iso-alkanic waxes typically have carbon lengths that are predominantly greater than C-30. Additionally, the viscosity of iso-alkanic waxes is greater than 10 mm$^2$/s and the molecular weight is greater than 600 MW.

The typical physical specifications of the two types of waxes are as shown below:

|  | Normal-Alkanic | Iso-Alkanic |
| --- | --- | --- |
| Melting Range (ASTM D127 (°C.)) | 15–70 | 62–99 |
| Penetration (@ 25° C.) (ASTMD1321 mm/10) | 9–50 | 3–60 |
| Visc. (98.9° C., mm2/s) | 3–6 | 10–30 |
| Avg. Molecular Weight | 350–420 | 600–800 |
| HC unit types present |  |  |
| % normal-alkanes (paraffinic compounds) | 60–100 | 20–70 |
| % iso-alkanes (iso-paraffinic compounds) normal-alkane C-chain Carbon chain lengths | 0–40 | 30–80 |
| <30 | 50–99% | 1–40% |
| 30–40 | 1–50% | 30–50% |
| >40 | <1% | 30–70% |
| Crystal size of solid wax | large | small |

It was determined that compatibility of gum bases made using normal-alkanic wax is less when compared to gum bases made with iso-alkanic waxes. It was therefore discovered that carbon chain length and carbon chain structure may have an effect on the degree of incompatibility.

Bases containing waxes having normal alkanic carbon chains of less than C-30 would be less compatible than those using waxes having normal-alkanic carbon chains of greater than C-30. More so, these latter bases would be even less compatible than gum bases containing iso-alkanic carbon chains greater than C-30.

Also, in the latter bases (using > "C-30 wax"), the wax forms smaller crystals when hard versus the wax of former bases, thus flavor oil retention is enhanced.

As was previously noted, lecithin includes phosphatides. The phosphatides present in lecithin are used in gum base for various reasons, two of which are to aid in the compatibility of the other ingredients and to aid in flavor perception of the final gum made using such a base. The oil of a typical lecithin composition usually introduces more unsaturated oils into the gum base that only increases the incompatibility of the base. Furthermore, if the oil is soy, this adversely effects the flavor perception of the gum.

Thus, with the inventive use of non-soy powdered lecithin, at approximately 0.1 to about 6.0% by weight of the base and preferably, from about approximately 1 to about 5%, and non-soy liquid lecithin at 1 to 10 percent, preferably approximately 1.2 to about 6 percent, alternative forms of lecithin that can be used in gum have been discovered which will afford the gum base the phosphatides necessary so as to be compatible with a wax-containing base. Additionally, these non-soy lecithins improve the gum flavor profile made from a wax or wax-free base.

Thus, pursuant to the present invention, improved gum bases and chewing gums made therefrom are provided.

Additionally, pursuant to the present invention, a color stable chewing gum base is provided. The color stable gum base reduces or eliminates darkening of the gum base over time at elevated temperatures.

In this regard, in an embodiment, the gum base includes a modified phosphatide. The modified phosphatide is provided as a substitute for phosphatidyl-ethanolamine that is present in lecithin, such as lecithin oil. It is, however, believed that a color stable base can be achieved by eliminating phosphatidyl ethanolamine from any gum base containing lecithin. Accordingly, in an embodiment of the present invention, a method of making gum base is provided comprising eliminating from a typical lecithin containing gum base formula phosphatidyl ethanolamine.

As noted previously, technically, lecithin refers to phosphatidyl choline. However, "lecithin" as that term is typically used in the industry refers to a "lecithin oil" mixture that is derived from glycerides or vegetable oils. A typical composition of commercial (supplier) lecithin derived from soybean oil is:

| Phosphatidyl choline | 21% |
| --- | --- |
| Phosphatidyl ethanolamine | 22% |
| Phosphatidyl inositol | 19% |
| Phosphatidic Acid | 10% |
| Phosphatidyl serine | 1% |
| Glycolipids | 12% |
| Other | 15% |

The structures of phosphatides typically found in commercially available lecithin oils are:

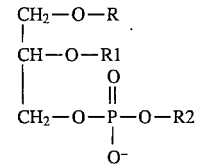

R= a fatty acid

R1= a fatty acid or an optional side-chain identical to R2

R2= a primary side-chain have the structure

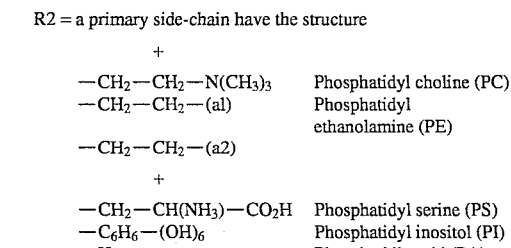

al = —NH$_3$ of the optional R1 side-chain a2 = —NH$_3$ of the primary side chain R2

It has been determined that the darkening of gum base that contains lecithin is due to a carbonyl-amine (Maillard) reaction. In this reaction, the gum base is darkened because saccharides that are present (such as reducing sugars, glucose, fructose, glycolipids, maltose, etc.) react over time at elevated temperatures with amines of the phosphatides that are also present. This results in a browning of the product.

The amines that can be present in the lecithin oil include the following structure:

$$P-NH_2 \quad (1)$$

$$P-\underset{Y}{NH} \quad (2)$$

$$P-\underset{Y}{N}-Y \quad (3)$$

$$P-\overset{+}{\underset{Y}{N}}-Y \quad (4)$$

$$P-\overset{+}{\underset{Y}{NH}} \quad (5)$$

$$P-\overset{+}{\underset{Y}{NH_2}} \quad (6)$$

$$P-\overset{+}{N}H_3 \quad (7)$$

wherein: P= the remaining structure of the phosphatide, $$\begin{array}{c} CH_2-O-R \\ | \\ CH-O-R1 \\ | \quad\quad O \\ | \quad\quad \| \\ CH_2-O-P-O-CH_2-CH_2- \\ | \\ O^- \end{array}$$

(1) is a primary amine; (2) is a secondary amine; (3) is a tertiary amine; (4)–(7) are quaternary amines. Y can be any atomic entity or side chain, alike or different from each other.

The type of Y-entities or side chains further describe the amine. If all the Y-entities are identical for the secondary or tertiary amines, then the amine will be a simple amine. If the Y-entities are different, then one has mixed amines. With respect to the phosphatide, the type of Y-side chain or entity also determines the type of phosphatide. For example, if the Y-entity in (4) above was —CH$_3$ and all the Y-side chains were identical, then the phosphatide would be phosphatidyl choline. If the Y-entity was —H in (4) above, then the phosphatide would be phosphatidyl ethanolamine.

Phosphatidyl ethanolamine, because of its quaternary protonated amine, is more prone to undergo a carbonylamine reaction. It has been determined that if phosphatidyl ethanolamine is eliminated from typical lecithin oil, the Maillard reaction will not occur. Additionally, if a modified phosphatide is used in the place of phosphatidyl ethanolamine, all of the desirable properties of lecithin oil can be provided without discoloration.

Pursuant to the present invention, modified phosphatides are provided wherein a side-chain or entity, most often a hydrogen atom, of the quaternary amine is replaced with one or more side groups other than —CH$_3$ or $$\begin{array}{c} O \\ \| \\ -C-O. \end{array}$$

These groups, that are identified as the Z side chains hereinafter, hinder the reducing sugar's (saccharide's) carbonyl group from reacting with the phosphatide amine group thus preventing the carbonylamine reaction.

The side groups may be linear or branched hydrocarbons such as, but not limited to, alkanes, iso-alkanes, alkenes, iso-alkenes, fatty acids, acetylated hydrocarbons such as acetate, or sulfatic and sulfitic groups such as sulfur dioxide and bisulfitic ions. These later groups are well suited for the low moisture environment of the gum base since their disassociation is high in a water environment.

The preferred side groups are sulfur dioxide, sodium or potassium bisulfate, and acetate. The most preferred side group is acetate. A preferred modified phosphatide for use in the gum base to reduce or eliminate browning via inhibition of the reducing sugar reaction with amine is acetylated phosphatidyl ethanolamine.

Although phosphatidyl ethanolamine is a phosphatide that readily reacts with sugar present in the lecithin producing darker brown discoloration, it has been discovered that when acetylated, it will prevent the reaction. The acetylated phosphatidyl ethanolamine can have the following structure:

$$\begin{array}{c} CH_2-O-R \\ | \\ CH-O-R1 \\ | \quad\quad O \\ | \quad\quad \| \\ CH_2-O-P-O-R2 \\ | \\ O \end{array}$$

R1=fatty acid side chain
R2= —CH$_2$—CH$_2$—(a3) side chain (acetyl group) a3 is a tertiary amine and is modified version of the quaternary amine a2, the a3 structure being $$\begin{array}{c} O \quad H \\ \| \quad | \\ -NH-C-C-H \\ | \\ H \end{array}$$

In the acetylation reaction, the quaternary a2 amine loses a hydrogen atom forming one H$_2$O, becoming tertiary.

By using the modified phosphatide, a heat stable replacement for heat unstable lecithin is provided. This allows the advantageous properties provided by the heat unstable lecithin to be provided to the gum base. At the same time, however, it will produce a chewing gum without the disadvantages property of discoloration.

The modified phosphatide, e.g., acetylated phosphatidyl ethanolamine, can be used alone as a substitute for a "lecithin" mixture (e.g., lecithin oil or powdered lecithin) or with other ingredients of a typical lecithin mixture, for example: phosphatidyl choline; phosphatidyl inositol; phosphatidic acid; phosphatidyl serine; glycolipids; and other ingredients. Preferably, the modified phosphatide comprises at least approximately 0.1 percent and most preferably, at least 0.3 percent of the gum base. In a preferred embodiment, the modified phosphatide comprises approximately 0.3 to about 10 weight percent of the gum base.

The non-soy lecithin compositions of the present invention can be used in a variety of chewing gum bases to make a variety of chewing gums.

In general, a chewing gum composition typically comprises a water-soluble bulk portion, a water-insoluble chewable gum base portion, and flavoring agents. The water-soluble portion dissipates with a portion of the flavoring agent over a period of time during chewing. The gum base portion is retained in the mouth throughout the chew. The term chewing gum refers to both a chewing and bubble type gum in its general sense.

The insoluble portion of the gum typically may contain any combination of elastomers, vinyl polymers, elastomer plasticizers, fillers, softeners, waxes and other optional ingredients such as colorants and antioxidants.

The variety of gum base ingredients typically used provide the ability to modify the chewing characteristics of gums made from the gum base.

Elastomers provide the rubbery, cohesive nature to the gum which varies depending on this ingredient's chemical structure and how it may be compounded with other ingredients. Elastomers suitable for use in the gum base and gum of the present invention may include natural or synthetic types.

Natural elastomers may include natural rubber such as smoked or liquid latex and guayule, natural gums such as jelutong, lechi caspi perillo, massaranduba balata, massaranduba chocolate, nispero rosidinha, chicle, gutta percha, gutta kataiu, niger gutta, tunu, chilte, chiquibul, gutta hang kang. Synthetic elastomers may include high molecular weight elastomers such as butadiene-styrene copolymers and isobutylene-isoprene copolymers, low to high molecular weight elastomers such as polybutadiene and polyisobutylene, vinyl polymeric elastomers such as polyvinyl acetate, polyethylene, vinyl copolymeric elastomers such as vinyl acetate/vinyl laurate, vinyl acetate/vinyl stearate, ethylene/vinyl acetate, polyvinyl alcohol or mixtures thereof.

Butadiene-styrene type elastomers, or SBR as they may be called, typically are copolymers of from about 20:80 to 60:40 styrene:butadiene monomers. The ratio of these monomers effects the elasticity of the SBR as evaluated by mooney viscosity. As the styrene:butadiene ratio decreases, the mooney viscosity decreases.

Isobutylene-isoprene type elastomers, or butyl as they may be called, have molar percent levels of isoprene ranging from 0.2 to 4.0. Similar to SBR, as the isoprene:isobutylene ratio decreases, so does the elasticity, measured by mooney viscosity.

The structure of SBR typically consists of straight chain 1,3-butadiene copolymerized with phenylethylene (styrene) and provides the non-linear molecular nature of these elastomers. The structure of butyl rubber typically consists of branched 2-methyl-1,3-butadiene (isoprene) copolymerized with branched 2-methylpropene (isobutylene), and, as with SBR, this type of structure is non-linear in nature.

Polyisobutylene, or PIB as they may be called, type elastomers are polymers of 2-methylpropene and, as with SBR and butyl, are non-linear in nature. These elastomers provide soft chew characteristics to the gum base and still provide the elastic qualities as do the other elastomers. Average molecular weights may range from about 30,000 to 120,000 and the penetration may range from about 4 millimeters to 20 millimeters. The higher the penetration, the softer the PIB.

Vinyl polymeric and copolymeric type elastomers provide tack resistance, vary the chew characteristics of gums made from these bases having vinyl polymers and offer hydrophilic properties beneficial to sensory perception of the final gums.

For copolymeric types, the amount of vinyl laurate, vinyl stearate, or ethylene present in the vinyl laurate/vinyl acetate (VL/VA), vinyl stearate/vinyl acetate (VS/VA), or ethylene/ vinyl acetate (EVA) copolymers respectively typically ranges from about 10 to about 60 percent by weight of the copolymer. Average molecular weights of these polymers may range from about 2000 to about 80000.

Polyvinyl acetate having an average molecular weight from about 8000 to about 65000 are preferred for use in the gum base and chewing gum of the present invention. More preferred for gum bases are those of from about 10000 to about 35000 molecular weight and for bubble gum bases, those having from about 30000 to about 60000 molecular weight.

Polymers of vinyl acetate (PVAc), are branched in nature. The degree of branching is increased when vinyl acetate monomers are copolymerized with vinyl laurate, vinyl stearate, ethylene and the like. The higher the degree of branching, the higher the compatibility when blended or compounded with normal-alkanic and iso-alkanic type waxes.

The preferred elastomers for use in a gum base or gum of the present invention are the synthetic elastomers which include butadiene-styrene copolymers and isobutylene-isoprene copolymers, low to high molecular weight elastomers such as polybutadiene and polyisobutylene, vinyl polymeric elastomers such as polyvinyl acetate, polyethylene, vinyl copolymeric elastomers such as vinyl acetate/vinyl laurate, vinyl acetate/vinyl stearate, ethylene/vinyl acetate, polyvinyl alcohol or mixtures thereof.

More preferably, the synthetic elastomers used are butadiene-styrene copolymers and isobutylene-isoprene copolymers, low to high molecular weight elastomers such as polyisobutylene, polyvinyl acetate, polyethylene, or mixtures thereof. These preferred elastomers may be used in large block form or may be reduced in size by shredding or grinding prior to use in the gum base.

Other optional ingredients such as antioxidants may also be used in the gum base.

Antioxidants prolong shelf-life and storage of gum base, finished gum or their respective components including fats and flavor oils. Antioxidants suitable for use in gum base or gum of the present invention include butylated hydroxyanisole (BHA), butylated hydroxytoluene (BHT), betacarotenes, tocopherols, acidulants such as Vitamin C, propyl gallate, other synthetic and natural types or mixtures thereof.

Preferably, the antioxidants used in the gum base are butylated hydroxyanisole (BHA), butylated hydroxytoluene (BHT), tocopherols, or mixtures thereof.

Petroleum waxes aid in the curing of the FG made from the gum base as well as improve shelf-life and texture. Wax crystal size when hard also improves the release of flavor. Those waxes high in iso-alkanes have a small crystal size than those waxes high in normal-alkanes, especially those with normal-alkanes of carbon numbers less than 30. The smaller crystal size allows slower release of flavor since their is more hindrance of the flavor's escape from this wax versus a wax having larger crystal sizes.

Preferably, the gum base and gum of the present invention employs petroleum waxes containing little if any normal-alkanes, or straight-chained alkanes as they may be called, and contain predominantly iso-alkanes, or branched chain alkanes, having carbon chain lengths greater than about 30. Formulation of some gum bases of this type may result in these gum bases being more homogenous and that have ingredients exhibiting more compatibility with each other. Again, this compatibility is the result of the branched nature of the other gum base ingredients.

As set forth above, the preferred waxes are those petroleum waxes having at least a viscosity of 10 $mm^2/s$, greater than 600 average molecular weight and containing predominantly iso-alkanes, or randomly branched alkanes as they may be called, of carbon lengths greater than 30. Those waxes that are not preferred are those having less than 10 mm²/s viscosity, less than 600 average molecular weight, containing predominantly normal-alkanes of carbon lengths less than 30 and some terminally branched iso-alkanes. Synthetic waxes are produced by means atypical of petroleum wax production and thus are not considered petroleum wax. These synthetic waxes may be used in accordance with the present invention and may be included optionally in the gum base and gum.

The synthetic waxes may include waxes containing branched alkanes and copolymerized with monomers such as but not limited to propylene and polyethylene and Fischer Tropsch type waxes. Polyethylene wax is a synthetic wax containing alkane units of varying lengths having attached thereto ethylene monomers.

The base may also be wax free. Wax free chewing gums are disclosed in, for example, U.S. Pat. No. 5,286,500, the disclosure of which is incorporated herein by reference.

Elastomer plasticizers vary the firmness of the gum base. Their specificity on elastomer inter-molecular chain breaking (plasticizing) along with their varying softening points cause varying degrees of finished gum firmness and compatibility when used in base. This may be important when one wants to provide more elastomeric chain exposure to the alkanic chains of the waxes.

Elastomer plasticizers suitable for use in the present invention include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin, hydrogenated methyl esters of rosin, pentaerythritol ester of rosin, synthetic elastomer plasticizers such as terpene resins derived from alpha-pinene, beta-pinene and/or d-limonene and mixtures thereof.

The elastomer plasticizers used may be of one type or of combinations of more than one type. Typically, the ratios of one to the other are dependent on each respective softening point, the effect on flavor release, and the respective degree of tack they case to the gum. Ball and ring softening points of the rosin ester types described above may range from about 45° C. to about 120° C. Softening points of the terpene resins may range from about 60° C. to about 130° C.

Occasionally, both terpene and rosin ester resins may be used in the present invention. The terpene:rosin ester ratios may range from about 1:15 to about 15:1.

Softeners modify the texture, cause the hydrophobic and hydrophilic components of the base to be miscible, and may further plasticize the synthetic elastomers of the gum base. Softeners suitable for use in the gum base and gum of the present invention include triglycerides of non-hydrogenated, partially hydrogenated and fully hydrogenated cottonseed, palm, palm kernel, coconut, safflower, tallow, cocoa butter, medium chained triglycerides and the like.

The preferred softeners include unsaturated, partially unsaturated, or fully saturated oils that contain, as one or more of their constituent groups, fatty acids of carbon chain length of from 6 to 18, determined from the fatty acid methyl ester distribution of gas chromatography.

The selection of softeners has an influence on the softness of the base. The caproic, caprylic, capric, myristic, lauric and palmitic fatty acids of the triglycerides tend to plasticize the synthetic elastomers more than triglycerides containing predominantly stearic fatty acid. As examples, triglycerides high in saturated lauric fatty acid more effectively plasticize the vinyl laurate/vinyl acetate copolymer, and those high in saturated palmitic fatty acid more effectively plasticize the polyvinyl acetate polymer, increasing the branching.

Monoglycerides, diglycerides, acetylated monoglycerides, distilled mono- and diglycerides and lecithin may, from their manufacturing processing, contain triglyceride levels less than 2 percent by weight. Though these ingredients are softeners, they would not be considered as being the same family as the above mentioned softeners oils and would be in a family of their own.

Fillers used in gum base modify the texture of the gum base and aid in processing. Fillers suitable for use in the gum base and gum of the present invention include carbonate, ground limestone and silicate types such as magnesium and aluminum silicate, clay, alumina, talc, as well as titanium oxide, mono-, di- and tricalcium phosphate, cellulose polymers such as ethyl, methyl and wood or mixtures thereof.

Particle size has an effect on cohesiveness, density and processing characteristics of the gum base and its compounding. The smaller the particle size, the more dense and cohesive the final gum base. Also, by selecting fillers based on their particle size distribution, initial mass compounding may be varied, thus allowing alteration of the compounding characteristics of the initial mass during gum base processing and ultimately the final chew characteristics of gums made from these gum bases.

Talc filler may be used in the gum base and gum of the present invention that may come in contact with or employ acid flavors or provide an acidic environment needed to prevent degradation of an artificial sweetener by reacting with calcium carbonate type fillers. Mean particle size for calcium carbonate and talc fillers typically range from about 0.1 micron to about 15 microns.

Preferably, the fillers used in the gum base and gum of the present invention are calcium carbonate, ground limestone, talc, mono-, di- and tricalcium phosphate, zirconium silicate, or mixtures thereof.

More preferably, the fillers used have a mean particle size range from about 0.4 to about 14 microns and are calcium carbonate and talc.

The starting mass preferably may comprise one or more of filler, elastomer, elastomer plasticizer, vinyl polymer or copolymer. Preferably, the starting mass is comprised of some or all of the natural or synthetic elastomer, some or all of the filler and some or all of the elastomer plasticizer.

The levels of gum base ingredients present in the starting mass may range from about 0 percent to about 40 percent elastomer plasticizer, 0–15 percent vinyl polymer, 0 to 40 percent and from about 10 percent to about 40 percent elastomer, all by weight of the gum base ingredient.

Flavorants and colorants impart characteristics or remove or mask undesired characteristics. Colorants may typically include FD&C type lakes, plant extracts, fruit and vegetable extracts and titanium dioxide flavorants may typically include cocoa powder, heat-modified amino acids and other vegetable extracts.

Preferably, the colorant and flavorant are FD&C type lakes and cocoa powder respectively and are present at levels from about 0 percent to about 15 percent by weight.

Gum bases are typically prepared by adding an amount of the elastomer, elastomer plasticizer and filler, and on occasion a vinyl polymer, to a heated (50°–240° F.) sigma blade mixer with a front to rear speed ratio of from about 1.2:1 to about 2:1, the higher ratio typically being used for chewing gum base which requires more rigorous compounding of its elastomers.

The initial amounts of ingredients comprising the initial mass may be determined by the working capacity of the mixing kettle in order to attain a proper consistency and by the degree of compounding desired to break down the elastomer and increase chain branching. The higher the level of filler at the start or selection of a filler having a certain particle size distribution, the higher the degree of compounding and thus more of the elastomeric chain crosslinking are broken, causing more branching of the elastomer thus lower viscosity bases and thus softer final gum base and gum made from such a base. The longer the time of compounding, the use of lower molecular weight or softening point gum base ingredients, the lower the viscosity and firmness of the final gum base.

Compounding typically begins to be effective once the ingredients have massed together. Anywhere from 15 minutes to 90 minutes may be the length of compounding time. Preferably, the time of compounding is from 20 minutes to about 60 minutes. The amount of added elastomer plasticizer depends on the level of elastomer and filler present. If too much elastomer plasticizer is added, the initial mass becomes over plasticized and not homogeneous.

After the initial ingredients have massed homogeneously and compounded for the time desired, the balance of the base ingredients are added in a sequential manner until a completely homogeneous molten mass is attained. Typically, any remainder of elastomer, elastomer plasticizer, vinyl polymer and filler, are added within 60 minutes after the initial compounding time. The filler and the elastomer plasticizer would typically be individually weighed and added in portions during this time. The optional waxes and the oils are typically added after the elastomer and elastomer plasticizers and during the next 60 minutes. Then the mass is allowed to become homogeneous before dumping.

Typical base processing times may vary from about one to about three hours, preferably from about 1½ to 2½ hours, depending on the formulation. The final mass temperature when dumped may be between 70° C. and 130° C. and preferably between 100° C. and 120° C. The completed molten mass is emptied from the mixing kettle into coated or lined pans, extruded or cast into any desirable shape and allowed to cool and solidify. Those skilled in the art will recognize that many variations of the above described procedure may be followed.

Examples of gum bases having modified phosphatides made in accordance with the present invention are shown in Tables 1 and 2 below. These are presented to exemplify embodiments of the present invention and in no way are presented to limit the scope of the present invention.

Gum formulas may comprise from about 10 to about 95 weight percent of a gum base made in accordance with the present invention in a gum formula typically known to those in the art and may have added thereto non-soy lecithin. This lecithin may be added as a powder or may be pre-blended with oils other than medium chain triglycerides.

The water-soluble portion of the chewing gum may comprise softeners, sweeteners, flavoring agents and combinations thereof. The sweeteners often fill the role of bulking agents in the gum. The bulking agents generally comprise from about 5 percent to about 90 percent, preferably from about 20 percent to about 80 percent of the chewing gum.

Softeners are added to the chewing gum in order to optimize the chewability and mouth feel of the gum. Softeners typically constitute from about 0.5 percent to about 25.0 percent by weight of the chewing gum. Softeners contemplated for use in the gum include glycerin, modified lecithin and combinations thereof. Further aqueous sweetener solutions such as those containing sorbitol, hydrogenated starch hydrolysates, corn syrup and combinations thereof may be used as softeners and bulking agents in gum. Sugar-free formulations are also typical.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The sweetener for use in the present invention can also be used in combination with sugarless sweeteners. Generally, sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol an the like, alone or in any combination.

Depending on the particular sweetness release profile and shelf-life stability needed, bulk sweeteners of the present invention can also be used in combination with coated or uncoated high-intensity sweeteners or with high-intensity sweeteners coated with other materials and by other techniques.

High-intensity sweeteners, or artificial sweeteners and peptide sweeteners as they may be referred to, typically may include, but are not limited to, alitame, thaumatin, aspartame, sucralose, acesulfame, saccharin and dihydrochalcones. The range of these sweetener types in gum typically may range from about 0.02 to 0.10 weight percent for sweeteners such as alitame, thaumatin and dihydrochalcones, and from about 0.1 to about 0.3 weight percent for sweeteners like aspartame, sucralose, acesulfame and saccharin.

A flavoring agent may be present in the chewing gum in an amount within the range of from about 0.5 to about 3.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the initial ingredients have been thoroughly mixed, the gum mass is discharged from the mixer and shaped into the desired form such as by rolling into sheets and cutting into sticks, extruded into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

Gum bases were made not in accordance with the present invention and compared to those made in accordance with the present invention. Gums were made from these bases and their flavor profiles evaluated.

Those bases containing wax were seen to be less compatible with the liquid lecithin. The compatibility was seen to improve when powdered lecithin of the invention was added. Though the wax containing bases with liquid non-soy based lecithins were acceptable, they were slightly less compatible than those having powdered non-soy lecithin added.

Gums using a typical wax-free gum base was made and the mint flavor characteristics of this gum was compared to that of each of a gum having (1) first the soy based fats replaced with non-soy fats, (2) then, the soy lecithin liquid replaced with a non-soy lecithin liquid.

Gum made from base (2) had stronger mint flavor and a longer coolness sensation. The gum made from (1), though not as improved as that of the gum using base (2), had stronger mint flavor and cooling sensation than that of a gum made from base (1), the standard and typical base. Some poor flavor notes were noticed. The gum made from (1) also had poor flavor notes, attributed to the soy fats.

Thus, replacing the soy lecithin of the gum base with a non-soy lecithin improves the flavor characteristics of the gum. Further gum flavor improvements are associated with replacing the remaining soy fats with non-soy fats in addition to the lecithin replacement.

Examples of gum formulas including modified phosphatides made in accordance with the present invention are shown in Table 1. These are presented to exemplify embodiments of the present invention and in no way are presented to limit the scope of the present invention.

By way of example, and not limitation, examples of the present invention will now be given:

TABLE NO. 1

EXAMPLES OF MODIFIED PHOSPHATIDE USE IN GUM BASE

| Base Type | BB | BB | BB | BB | BB |
|---|---|---|---|---|---|
| Ingredient |  |  |  |  |  |
| Wax |  |  |  |  |  |
| Micro MP >70° C. | — | — | 12 | 20 | — |
| Elastomer Present |  |  |  |  |  |
| SBR | 9 | 8 | 8 | 7 |  |
| Butyl |  |  |  |  | 2 |
| Natural |  |  |  |  |  |
| PIB |  |  |  |  | 9 |
| Elastomer Plast |  |  |  |  |  |
| Rosin Esters | 36 | 49 | 42 | 24 |  |
| Terpene Resin |  |  |  |  | 13 |
| Filler | 46 | 37 | 34 | 40 | 15 |
| Vinyl Polymers |  |  |  |  |  |
| Mol Wgt <15000 |  |  |  |  |  |
| 15000 < x <50000 |  |  |  |  | 10 |
| Mol Wgt >50000 |  |  |  |  | 16 |
| Glycerol M.S. | 1 | 3 | 4 | 1 | 8 |
| Hyd. Veg. Oil |  |  |  |  |  |
| MP >55° C. |  |  |  |  |  |
| MP <55° C. | 1 |  | 1 |  |  |
| Modified Phosphatide | 7 | 3 | 1 | 4 | 2 |
| Acetylated Glyc. |  |  |  |  | 5 |
| Triacetin |  |  |  | 3 |  |

TABLE NO. 2

| Base Type | CB | CB | CB | CB | CB | CB | CB |
|---|---|---|---|---|---|---|---|
| Ingredient |  |  |  |  |  |  |  |
| Wax |  |  |  |  |  |  |  |
| Micro MP >70° C. | — | — | — | — | 16 | 19 | 30 |
| Elastomer Present |  |  |  |  |  |  |  |
| SBR |  |  |  |  |  |  |  |
| Butyl | 8 | 5 | 9 | 6 | 7 | 9 | 7 |
| Natural | 25 | 28 |  | 25 |  | 3 |  |
| PIB | 4 | 3 |  | 1 |  | 6 |  |
| Elastomer Plast |  |  |  |  |  |  |  |
| Rosin Esters | 14 | 16 | 30 | 21 | 22 | 19 | 11 |
| Terpene Resin |  |  |  |  | 3 |  |  |
| Filler | 14 | 9 | 42 | 6 | 24 | 22 | 20 |
| Vinyl Polymers |  |  |  |  |  |  |  |
| Mol Wgt <15000 | 19 | 27 |  | 38 | 1 | 13 | 8 |
| 15000 < x <50000 |  |  |  |  |  |  |  |
| Mol Wgt >50000 |  |  |  |  |  |  |  |
| Polyethylene |  |  |  |  | 2 |  |  |
| Glycerol M.S. | 2 |  | 8 |  | 3 | 4 | 6 |
| Hyd. Veg. Oil |  |  |  |  |  |  |  |
| MP >55° C. | 8 | 6 | 4 |  | 5 | 6 |  |
| MP <55° C. |  |  |  |  |  |  |  |
| Modified Phosphatide | 6 | 5 | 7 | 3 | 2 | 1 | 4 |

TABLE NO. 3

|  | Sugar Gum | Sugarless Gum |
|---|---|---|
| Water Insoluble Ingredients | | |
| Gum Base | 10–50 | 23–55 |
| Flavor oil | 0.2–2.5 | 0.2–3.5 |
| Water Soluble Ingredients | | |
| Natural Sweetener | 35–65 | — |
| Polyol Sweeteners | — | 30–65 |
| Corn Syrup | 5–35 | — |
| Glycerine | 0.1–3.5 | 3–25 |
| Optional Ingredients | | |
| Softeners | 0–2 | 0–2 |
| Water | 0–0.3 | — |
| Artificial Sweeteners | 0–0.6 | 0–0.6 |
| Fruit Acids | 0–0.6 | 0–0.6 |

Examples of natural and synthetic gum bases containing wax, non-soy lecithin, and made in accordance with the present invention are shown in Table 4, Examples 1–15. Examples of wax-free chewing gum bases including non-soy lecithin made in accordance with the present invention are shown in Table 5, Examples 1–39. These examples are presented to exemplify embodiments of the present invention and in no way are presented to limit the scope of the present invention.

TABLE 4

|  | Ex. 1 | Ex. 2 | Ex. 3 |
|---|---|---|---|
| Butyl Rubber | — | — | 2.5 |
| Styrene Butadiene Rubber | 10.3 | 1.6 | — |
| Polyisobutylene | — | 9.1 | 9.0 |
| Jelutong | — | — | — |
| Ester Gum | 24.7 | 22.5 | 15.0 |
| Terpene Resin | — | — | — |
| Low MW Polyvinyl acetate | — | — | — |
| High MW Polyvinyl Acetate | — | 30.0 | 24.1 |
| Talc | — | — | 25.4 |
| Calcium Carbonate | 56.8 | 21.7 | — |
| Acetylated Monoglyceride | — | — | 4.0 |
| Hydrogenated Cottonseed Oil | 1.5 | — | — |
| Hydrogenated Soybean Oil | — | — | — |
| Partially Hydrogenated Soybean and Palm Oil | — | 2.0 | — |
| Partially Hydrogenated Cottonseed Oil | — | — | — |
| Non-Soy Lecithin Oil | — | 1.5 | — |
| Non-Soy Lecithin Powder | 1.5 | — | 3.5 |
| Glycerol Monostearate | 1.1 | — | 7.1 |
| Triacetin | — | 4.5 | 3.2 |
| Wax (C >30, Mw >600) | — | 2.2 | 6.2 |
| Wax (C < & >30, Mw <600) | 4.1 | 4.3 | — |
|  | 100.0 | 100.0 | 100.0 |

|  | Ex. 4 | Ex. 5 | Ex. 6 |
|---|---|---|---|
| Butyl Rubber | 11.7 | 10.0 | 9.0 |
| Styrene Butadiene Rubber | — | — | — |
| Polyisobutylene | — | 10.4 | 5.3 |
| Jelutong | — | — | — |
| Ester Gum | 14.8 | — | — |
| Terpene Resin | 9.9 | 6.8 | 16.7 |
| Low MW Polyvinyl acetate | 21.2 | 23.2 | 24.6 |
| High MW Polyvinyl Acetate | — | — | — |
| Talc | — | — | — |
| Calcium Carbonate | 11.32 | 14.7 | 20.1 |
| Acetylated Monoglyceride | — | — | — |
| Hydrogenated Cottonseed Oil | — | 21.1 | 3.3 |
| Hydrogenated Soybean Oil | 9.0 | — | — |
| Partially Hydrogenated Soybean and Palm Oil | — | — | — |
| Partially Hydrogenated Cottonseed Oil | — | 2.3 | 3.3 |
| Non-Soy Lecithin Oil | 8.4 | — | 5.0 |
| Non-Soy Lecithin Powder | — | 4.3 | — |
| Glycerol Monostearate | 4.8 | 4.1 | 4.2 |
| Triacetin | — | — | — |
| Wax (C >30, Mw >600) | 6.0 | 3.1 | 8.5 |
| Wax (C < & >30, Mw <600) | 3.0 | — | — |
|  | 100.0 | 100.0 | 100.0 |

|  | Ex. 7 | Ex. 8 | Ex. 9 |
|---|---|---|---|
| Butyl Rubber | 6.8 | 6.8 | 8.8 |
| Styrene Butadiene Rubber | — | — | — |
| Polyisobutylene | 3.0 | 3.2 | 4.1 |
| Jelutong | 21.1 | 18.2 | 4.0 |
| Ester Gum | 16.7 | 16.6 | — |
| Terpene Resin | — | — | — |
| Low MW Polyvinyl acetate | 16.6 | 16.1 | 25.0 |
| High MW Polyvinyl Acetate | — | — | — |
| Talc | — | — | 18.1 |
| Calcium Carbonate | 13.2 | 19.7 | — |
| Acetylated Monoglyceride | — | — | — |
| Hydrogenated Cottonseed Oil | 2.3 | 3.2 | 4.5 |
| Hydrogenated Soybean Oil | — | — | 2.7 |
| Partially Hydrogenated Soybean and Palm Oil | — | — | — |
| Partially Hydrogenated Cottonseed Oil | — | 2.0 | — |
| Non-Soy Lecithin Oil | 3.0 | — | — |
| Non-Soy Lecithin Powder | — | 1.8 | 3.3 |
| Glycerol Monostearate | 2.1 | 4.5 | 4.1 |
| Triacetin | — | — | — |
| Wax (C >30, Mw >600) | 15.2 | 6.8 | 6.1 |
| Wax (C < & >30, Mw <600) | — | 1.1 | 2.0 |
|  | 100.0 | 100.0 | 100.0 |

|  | Ex. 10 | Ex. 11 | Ex. 12 |
|---|---|---|---|
| Butyl Rubber | — | 9.1 | 9.3 |
| Styrene Butadiene Rubber | — | — | — |
| Polyisobutylene | 8.0 | 3.5 | 10.5 |
| Jelutong | — | 3.1 | — |
| Ester Gum | 14.7 | 1.5 | — |
| Terpene Resin | — | 15.0 | 13.0 |
| Low MW Polyvinyl acetate | — | 22.8 | 23.0 |
| High MW Polyvinyl Acetate | 34.5 | — | — |
| Talc | 28.6 | — | — |
| Calcium Carbonate | — | 23.0 | 14.9 |
| Acetylated Monoglyceride | 2.5 | — | — |
| Hydrogenated Cottonseed Oil | — | 4.6 | 8.0 |
| Hydrogenated Soybean Oil | — | 2.9 | 5.2 |
| Partially Hydrogenated Soybean and Palm Oil | — | — | 3.1 |
| Partially Hydrogenated Cottonseed Oil | — | — | 1.5 |
| Non-Soy Lecithin Oil | 0.9 | 0.3 | — |
| Non-Soy Lecithin Powder | — | 2.9 | 2.1 |
| Glycerol Monostearate | 4.4 | 2.8 | 4.5 |
| Triacetin | 4.6 | — | — |
| Wax (C >30, Mw >600) | — | 7.0 | 4.4 |
| Wax (C < & >30, Mw <600) | 1.8 | 1.5 | 0.5 |
|  | 100.0 | 100.0 | 100.0 |

|  | Ex. 13 | Ex. 14 | Ex. 15 |
|---|---|---|---|
| Butyl Rubber | 6.1 | 8.1 | — |
| Styrene Butadiene Rubber | — | — | 6.0 |
| Polyisobutylene | 7.1 | 5.5 | 7.5 |
| Jelutong | — | — | — |
| Ester Gum | — | 7.1 | 12.2 |
| Terpene Resin | 14.1 | 7.1 | — |
| Low MW Polyvinyl acetate | 28.1 | 22.2 | — |
| High MW Polyvinyl Acetate | — | — | 29.0 |

TABLE 4-continued

| | | | |
|---|---|---|---|
| Talc | — | — | 28.9 |
| Calcium Carbonate | 18.9 | 25.6 | — |
| Acetylated Monoglyceride | — | — | 3.7 |
| Hydrogenated Cottonseed Oil | 10.1 | 13.2 | 2.7 |
| Hydrogenated Soybean Oil | 5.1 | 5.1 | — |
| Partially Hydrogenated Soybean and Palm Oil | — | — | — |
| Partially Hydrogenated Cottonseed Oil | — | — | — |
| Non-Soy Lecithin Oil | — | 4.6 | — |
| Non-Soy Lecithin Powder | 4.8 | — | 1.3 |
| Glycerol Monostearate | 1.5 | 1.5 | 3.1 |
| Triacetin | — | — | 1.2 |
| Wax (C >30, Mw >600) | 3.1 | — | 4.4 |
| Wax (C < & >30, Mw <600) | 1.1 | — | — |
| | 100.0 | 100.0 | 100.0 |

TABLE 5

| GENERIC INGREDIENTS | IDENTIFICATION — EXAMPLES #: | | | | |
|---|---|---|---|---|---|
| | 1 | 2 | 3 | 4 | 5 |
| ** SYNTHETIC ELASTOMER ** | | | | | |
| POLYISOBUTYLENE ELASTOMER | 7.9 | 13.0 | 7.9 | 11.6 | 11.8 |
| POLYVINYL ACETATE | 34.2 | 37.1 | 34.2 | 37.8 | 35.6 |
| ** ELASTOMER PLASTICIZERS ** | | | | | |
| GLYCEROL ESTERS OF ROSIN | 14.8 | — | — | — | — |
| GLYCEROL ESTERS OF PART HYD ROSIN | — | 19.8 | 14.8 | 19.8 | 19.8 |
| ** FILLER ** | | | | | |
| CALCIUM CARBONATE | 29.8 | 16.5 | 29.8 | — | — |
| TALC | — | — | — | 17.0 | 19.7 |
| ** SOFTENER ** | | | | | |
| NON-SOY LECITHIN | 0.5 | 1.5 | 1.0 | 2.6 | 0.8 |
| GLYCEROL TRIACETATE | 5.3 | 5.6 | 4.3 | 3.0 | 4.0 |
| GLYCEROL MONOSTEARATE | 4.5 | 6.5 | 5.0 | 3.2 | 2.3 |
| ACETYLATED MONOGLYCERIDE | 3.0 | — | 3.0 | 5.0 | 6.0 |
| TOTAL PERCENT | 100.0 | 100.0 | 100.0 | 100.0 | 100.0 |
| | 6 | 7 | 8 | 9 | |
| ** SYNTHETIC ELASTOMER ** | | | | | |
| POLYISOBUTYLENE ELASTOMER | 17.1 | 11.7 | 11.6 | 5.4 | |
| POLYVINYL ACETATE | 24.9 | 29.4 | 31.5 | 34.8 | |
| ** ELASTOMER PLASTICIZERS ** | | | | | |
| GLYCEROL ESTERS OF ROSIN | 6.8 | 10.7 | 19.8 | 16.3 | |
| GLYCEROL ESTERS OF PART HYD ROSIN | — | — | — | — | |
| ** FILLER ** | | | | | |
| CALCIUM CARBONATE | — | — | — | 30.2 | |
| TALC | 34.7 | 34.1 | 21.9 | — | |
| ** SOFTENER ** | | | | | |
| NON-SOY LECITHIN | 1.1 | 3.4 | 3.0 | 2.0 | |
| GLYCEROL TRIACETATE | 4.6 | 4.4 | 5.0 | 5.3 | |
| GLYCEROL | 5.8 | 4.3 | 4.9 | 3.9 | |
| MONOSTEARATE ACETYLATED | 5.0 | 2.0 | 2.3 | 2.1 | |
| MONOGLYCERIDE TOTAL PERCENT | 100.0 | 100.0 | 100.0 | 100.0 | |
| | 10 | 11 | 12 | 13 | 14 |
| ** NATURAL ELASTOMER ** | | | | | |
| NATURAL GUM | 23.8 | 18.7 | 14.4 | 18.2 | 25.2 |
| ** SYNTHETIC ELASTOMER ** | | | | | |
| STYRENE-BUTADIENE ELASTOMER | — | — | — | — | — |
| BUTYL (ISOPRENE-ISOBUTYLENE) ELASTOMER | 3.1 | 6.0 | 9.1 | 6.8 | 2.4 |
| POLYISOBUTYLENE ELASTOMER | 7.7 | 5.5 | 3.6 | 5.4 | 4.9 |
| POLYVINYL ACETATE | 20.5 | 14.8 | 18.1 | 15.5 | 19.9 |
| ** ELASTOMER PLASTICIZERS ** | | | | | |
| GLYCEROL ESTERS OF ROSIN | — | — | 11.9 | — | 15.6 |
| GLYCEROL ESTERS OF PART HYD ROSIN | 10.4 | 15.5 | 13.0 | 12.7 | — |
| METHYL ESTERS OF ROSIN | 2.0 | — | — | 2.6 | — |
| TERPENE RESINS | 5.1 | — | — | — | 2.1 |
| ** FILLER ** | | | | | |
| CALCIUM CARBONATE | — | 18.8 | 14.1 | 15.7 | — |
| TALC | 5.3 | — | — | — | 7.1 |
| ** SOFTENER ** | | | | | |
| HYDROGENATED COTTONSEED OIL | — | 6.5 | 7.0 | — | — |
| HYDROGENATED SOYBEAN OIL | 7.9 | — | — | 5.0 | 10.0 |
| PARTIALLY HYDROGENATED SOYBEAN AND PALM OIL | — | — | 2.0 | — | — |
| PARTIALLY HYDROGENATED COTTONSEED OIL | — | — | — | 6.0 | — |
| NON-SOY LECITHIN | 7.9 | 6.5 | 6.8 | 5.0 | 8.4 |
| GLYCEROL MONOSTEARATE | 6.3 | 7.7 | — | 7.1 | 4.4 |
| TOTAL PERCENT | 100.0 | 100.0 | 100.0 | 100.0 | 100.00 |
| | 15 | 16 | 17 | 18 | |
| ** NATURAL ELASTOMER ** | | | | | |
| NATURAL GUM | 15.7 | 22.6 | 22.2 | 21.1 | |
| ** SYNTHETIC ELASTOMER ** | | | | | |
| STYRENE-BUTADIENE ELASTOMER | 1.9 | — | — | — | |
| BUTYL (ISOPRENE-ISOBUTYLENE) ELASTOMER | 3.7 | 5.8 | 5.7 | 6.1 | |
| POLYISOBUTYLENE ELASTOMER | 4.1 | 3.1 | 3.1 | 2.8 | |
| POLYVINYL ACETATE | 26.2 | 20.4 | 22.0 | 18.0 | |
| ** ELASTOMER PLASTICIZERS ** | | | | | |

TABLE 5-continued

| GENERIC INGREDIENTS | IDENTIFICATION — EXAMPLES #: | | | |
|---|---|---|---|---|
| GLYCEROL ESTERS OF ROSIN | — | — | — | 15.7 |
| GLYCEROL ESTERS OF PART HYD ROSIN | 15.3 | 11.7 | 15.2 | — |
| METHYL ESTERS OF ROSIN | — | 4.0 | — | — |
| TERPENE RESINS | — | — | — | — |
| ** FILLER ** | | | | |
| CALCIUM CARBONATE | 12.2 | 11.6 | 11.4 | — |
| TALC | — | — | — | 15.4 |
| ** SOFTENER ** | | | | |
| HYDROGENATED COTTONSEED OIL | 3.0 | 2.0 | — | 9.1 |
| HYDROGENATED SOYBEAN OIL | — | — | 6.2 | — |
| PARTIALLY HYDROGENATED SOYBEAN AND PALM OIL | — | 15.0 | — | — |
| PARTIALLY HYDROGENATED COTTONSEED OIL | 12.0 | — | 6.0 | — |
| NON-SOY LECITHIN | 0.1 | 0.5 | 4.9 | 6.0 |
| GLYCEROL MONOSTEARATE | 5.8 | 3.3 | 3.3 | 5.8 |
| TOTAL PERCENT | 100.0 | 100.0 | 100.0 | 100.0 |

| GENERIC INGREDIENTS | 19 | 20 | 21 | 22 |
|---|---|---|---|---|
| ** NATURAL ELASTOMER ** | | | | |
| NATURAL GUM | 22.0 | 25.1 | 22.8 | 17.6 |
| ** SYNTHETIC ELASTOMER ** | | | | |
| STYRENE-BUTADIENE ELASTOMER | — | 1.9 | 2.6 | — |
| BUTYL (ISOPRENE-ISOBUTYLENE) ELASTOMER | 4.8 | 2.1 | 4.1 | 10.2 |
| POLYISOBUTYLENE ELASTOMER | 5.7 | 4.7 | 3.2 | 2.1 |
| POLYVINYL ACETATE | 16.4 | 24.8 | 16.3 | 26.9 |
| ** ELASTOMER PLASTICIZERS ** | | | | |
| GLYCEROL ESTERS OF ROSIN | 3.8 | 3.2 | 6.9 | 11.3 |
| GLYCEROL ESTERS OF PART HYD ROSIN | 12.3 | 12.6 | 11.8 | 4.8 |
| METHYL ESTERS OF ROSIN | — | 2.1 | 1.7 | — |
| TERPENE RESINS | — | — | — | — |
| ** FILLER ** | | | | |
| CALCIUM CARBONATE | — | 4.4 | 9.3 | — |
| TALC | 7.1 | — | — | 4.6 |
| ** SOFTENER ** | | | | |
| HYDROGENATED COTTONSEED OIL | — | — | 10.0 | 5.6 |
| HYDROGENATED SOYBEAN OIL | 5.0 | — | — | — |
| PARTIALLY HYDROGENATED SOYBEAN AND PALM OIL | 11.0 | 12.0 | — | 5.0 |
| PARTIALLY HYDROGENATED COTTONSEED OIL | 5.0 | — | 3.7 | — |
| NON-SOY LECITHIN | 0.8 | 3.3 | 7.6 | 5.6 |
| GLYCEROL MONOSTEARATE | 6.1 | 3.8 | — | 6.3 |
| TOTAL PERCENT | 100.0 | 100.0 | 100.0 | 100.0 |

| GENERIC INGREDIENTS | 23 | 24 | 25 | 26 | 27 |
|---|---|---|---|---|---|
| ** SYNTHETIC ELASTOMER ** | | | | | |
| STYRENE-BUTADIENE ELASTOMER | 5.3 | — | 2.1 | 1.8 | — |
| BUTYL (ISOPRENE-ISOBUTYLENE) ELASTOMER | 8.6 | 7.9 | 7.2 | — | 8.1 |
| POLYISOBUTYLENE ELASTOMER | 7.1 | — | 7.4 | 24.8 | 3.6 |
| POLYVINYL ACETATE | 10.5 | 27.2 | 15.3 | 10.1 | 27.3 |
| ** ELASTOMER PLASTICIZERS ** | | | | | |
| GLYCEROL ESTERS OF ROSIN | 2.1 | — | 19.0 | 3.7 | — |
| GLYCEROL ESTERS OF PART HYD ROSIN | 4.3 | 18.2 | — | 7.9 | — |
| TERPENE RESINS | 10.8 | — | — | 7.1 | 26.8 |
| ** FILLER ** | | | | | |
| CALCIUM CARBONATE | — | 15.9 | 20.7 | 17.7 | 11.4 |
| TALC | 25.5 | — | — | — | — |
| ** SOFTENER ** | | | | | |
| HYDROGENATED COTTONSEED OIL | — | 6.0 | — | 7.0 | — |
| HYDROGENATED SOYBEAN OIL | 4.3 | — | 6.1 | — | — |
| PARTIALLY HYDROGENATED SOYBEAN AND PALM OIL | 3.3 | — | 6.0 | — | 9.1 |
| PARTIALLY HYDROGENATED COTTONSEED OIL | — | 5.3 | — | 7.0 | — |
| NON-SOY LECITHIN | 10.0 | 12.1 | — | 9.4 | 8.9 |
| GLYCEROL MONOSTEARATE | 8.2 | 7.4 | 4.0 | 3.5 | 4.8 |
| TOTAL PERCENT | 100.0 | 100.0 | 100.0 | 100.0 | 100.0 |

| GENERIC INGREDIENTS | 28 | 29 | 30 |
|---|---|---|---|
| ** SYNTHETIC ELASTOMER ** | | | |
| STYRENE-BUTADIENE ELASTOMER | 5.2 | 2.1 | 5.9 |
| BUTYL (ISOPRENE-ISOBUTYLENE) ELASTOMER | 4.1 | 7.2 | 6.9 |
| POLYISOBUTYLENE ELASTOMER | 5.9 | 7.3 | 2.0 |
| POLYVINYL ACETATE | 25.7 | 15.3 | 24.8 |
| ** ELASTOMER PLASTICIZERS ** | | | |
| GLYCEROL ESTERS OF ROSIN | 23.5 | 19.1 | 8.6 |
| GLYCEROL ESTERS OF PART HYD ROSIN | — | — | 8.0 |
| TERPENE RESINS | 3.2 | — | 1.9 |
| ** FILLER ** | | | |
| CALCIUM CARBONATE | 15.1 | 20.7 | 9.9 |
| TALC | — | — | 7.2 |
| ** SOFTENER ** | | | |
| HYDROGENATED COTTONSEED OIL | — | — | 7.0 |
| HYDROGENATED SOYBEAN OIL | — | — | — |
| PARTIALLY HYDROGENATED | 5.5 | 8.3 | 10.1 |

TABLE 5-continued

| GENERIC INGREDIENTS | IDENTIFICATION — EXAMPLES #: | | |
|---|---|---|---|
| SOYBEAN AND PALM OIL PARTIALLY HYDROGENATED COTTONSEED OIL | 3.0 | 9.6 | — |
| NON-SOY LECITHIN | 3.7 | 6.4 | 4.0 |
| GLYCEROL MONOSTEARATE | 5.1 | 4.0 | 3.7 |
| TOTAL PERCENT | 100.0 | 100.0 | 100.0 |

| | 31 | 32 | 33 | 34 |
|---|---|---|---|---|
| ** SYNTHETIC ELASTOMER ** | | | | |
| STYRENE-BUTADIENE ELASTOMER | 3.9 | 2.1 | — | — |
| BUTYL (ISOPRENE-ISOBUTYLENE) ELASTOMER | 5.3 | 6.0 | 8.9 | 3.6 |
| POLYISOBUTYLENE ELASTOMER | 12.7 | 8.5 | 10.0 | 11.1 |
| POLYVINYL ACETATE | 14.9 | 15.3 | 21.3 | 21.9 |
| ** ELASTOMER PLASTICIZERS ** | | | | |
| GLYCEROL ESTERS OF ROSIN | — | 10.1 | — | 19.6 |
| GLYCEROL ESTERS OF PART HYD ROSIN | — | 8.9 | — | 11.2 |
| TERPENE RESINS | 21.4 | — | 9.7 | 3.7 |
| ** FILLER ** | | | | |
| CALCIUM CARBONATE | 13.7 | 20.9 | 21.5 | 6.4 |
| TALC | 1.4 | — | — | — |
| ** SOFTENER ** | | | | |
| HYDROGENATED COTTONSEED OIL | — | 8.2 | 5.0 | 5.0 |
| HYDROGENATED SOYBEAN OIL | 3.7 | — | — | — |
| PARTIALLY HYDROGENATED SOYBEAN AND PALM OIL | 4.3 | 5.0 | — | 10 |
| PARTIALLY HYDROGENATED COTTONSEED OIL | — | — | 15.0 | — |
| NON-SOY LECITHIN | 13.0 | 11.0 | 3.2 | 4.2 |
| GLYCEROL MONOSTEARATE | 5.7 | 4.0 | 5.4 | 3.3 |
| TOTAL PERCENT | 100.0 | 100.0 | 100.0 | 100.0 |

| | 35 | 36 | 37 | 38 | 39 |
|---|---|---|---|---|---|
| ** SYNTHETIC ELASTOMER ** | | | | | |
| STYRENE-BUTADIENE ELASTOMER | — | 3.2 | 4.1 | — | — |
| BUTYL (ISOPRENE-ISOBUTYLENE) ELASTOMER | 7.4 | 7.3 | 11.3 | 10.0 | 8.3 |
| POLYISOBUTYLENE ELASTOMER | 1.9 | 7.5 | 7.9 | 1.9 | 3.6 |
| POLYVINYL ACETATE | 24.8 | 21.1 | 18.2 | 27.6 | 27.5 |
| ** ELASTOMER PLASTICIZERS ** | | | | | |
| GLYCEROL ESTERS OF ROSIN | — | 15.3 | — | — | — |
| GLYCEROL ESTERS OF PART HYD ROSIN | — | 2.4 | 26.2 | — | — |
| TERPENE RESINS | 25.8 | 5.8 | 1.4 | 25.3 | 25.3 |
| ** FILLER ** | | | | | |
| CALCIUM CARBONATE | 18.6 | — | 13.6 | 11.3 | 11.3 |
| TALC | — | 14.8 | — | — | — |
| ** SOFTENER ** | | | | | |
| HYDROGENATED COTTONSEED OIL | 7.1 | 4.4 | 1.2 | — | — |
| HYDROGENATED SOYBEAN OIL | — | — | — | 9.6 | 4.0 |
| PARTIALLY HYDROGENATED SOYBEAN AND PALM OIL | — | 4.0 | — | — | 4.2 |
| PARTIALLY HYDROGENATED COTTONSEED OIL | — | — | — | — | — |
| LECITHIN | 10.0 | 11.4 | 10.9 | 9.5 | 11.0 |
| GLYCEROL MONOSTEARATE | 4.4 | 2.8 | 5.2 | 4.8 | 4.8 |
| TOTAL PERCENT | 100.0 | 100.0 | 100.0 | 100.0 | 100.0 |

The formulas listed in Table 6 comprise various contemplative sugar formulas in which non-soy lecithin can be added at various levels to gum.

TABLE 6

| | (WEIGHT PERCENT) | | | | | |
|---|---|---|---|---|---|---|
| | Ex. 1 | Ex. 2 | Ex. 3 | Ex. 4 | Ex. 5 | Ex. 6 |
| Sugar | 61.55 | 61.5 | 61.35 | 62.5 | 62.0 | 61.0 |
| Base | 19.2 | 19.2 | 19.2 | 19.2 | 19.2 | 19.2 |
| Corn Syrup | 16.9 | 16.9 | 16.9 | 16.9 | 16.9 | 16.9 |
| Peppermint Flavor | 0.9 | 0.9 | 0.9 | 0.9 | 0.9 | 0.9 |
| Glycerin | 1.4 | 1.4 | 1.4 | 0.0 | 0.0 | 0.0 |
| Non-Soy Lecithin | 0.05 | 0.10 | 0.25 | 0.50 | 1.0 | 2.0 |

In Table 7, dextrose monohydrate is added to a sugar formula with various levels of non-soy lecithin

TABLE 7

| | Ex. 7 | Ex. 8 | Ex. 9 | Ex. 10 | Ex. 11 | Ex. 12 |
|---|---|---|---|---|---|---|
| Sugar | 55.65 | 55.6 | 55.45 | 56.2 | 55.7 | 54.7 |
| Base | 19.2 | 19.2 | 19.2 | 19.2 | 19.2 | 19.2 |
| Corn Syrup | 12.9 | 12.9 | 12.9 | 12.9 | 12.9 | 12.9 |
| Glycerin | 1.4 | 1.4 | 1.4 | 0.4 | 0.4 | 0.4 |
| Dextrose Monohydrate | 9.9 | 9.9 | 9.9 | 9.9 | 9.9 | 9.9 |
| Peppermint Flavor | 0.9 | 0.9 | 0.09 | 0.9 | 0.9 | 0.9 |
| Non-Soy Lecithin | 0.05 | 0.10 | 0.25 | 0.50 | 1.0 | 2.0 |

Examples 13–17 in Table 8 demonstrate the use of non-soy lecithin in medium-moisture sugar formulations having about 2% to about 5% moisture.

TABLE 8

| | Ex. 13 | Ex. 14 | Ex. 15 | Ex. 16 | Ex. 17 |
|---|---|---|---|---|---|
| Sugar | 53.35 | 53.2 | 52.9 | 52.3 | 52.0 |
| Gum Base | 19.2 | 19.2 | 19.2 | 19.2 | 19.2 |
| Corn Syrup[a] | 15.0 | 15.0 | 15.0 | 15.0 | 15.0 |
| Dextrose Monohydrate | 10.0 | 10.0 | 10.0 | 10.0 | 10.0 |
| Glycerin[b] | 1.4 | 1.4 | 1.4 | 1.4 | 1.4 |
| Flavor | 0.9 | 0.9 | 0.9 | 0.9 | 0.9 |
| Non-Soy Lecithin | 0.15 | 0.3 | 0.6 | 1.2 | 1.5 |

TABLE 8-continued

|  | Ex. 13 | Ex. 14 | Ex. 15 | Ex. 16 | Ex. 17 |
|---|---|---|---|---|---|

ªCorn syrup is evaporated to 85% solids, 15% moisture.
ᵇGlycerin and syrup can be blended and co-evaporated.

Examples 18–22 in Table 9 demonstrate the use of medium chain triglycerides in high moisture sugar formulations having more than about 5% moisture.

TABLE 9

|  | Ex. 18 | Ex. 19 | Ex. 20 | Ex. 21 | Ex. 22 |
|---|---|---|---|---|---|
| Sugar | 50.95 | 50.7 | 50.4 | 48.9 | 48.0 |
| Gum Base | 24.0 | 24.0 | 24.0 | 24.0 | 24.0 |
| Corn Syrup | 24.0 | 24.0 | 24.0 | 24.6 | 24.6 |
| Glycerin | 0.0 | 0.0 | 0.0 | 0.4 | 0.4 |
| Flavor | 1.0 | 1.0 | 1.0 | 1.0 | 1.0 |
| Non-Soy Lecithin | 0.05 | 0.3 | 0.6 | 1.2 | 1.5 |

Examples 23–27 in Table 10 and Examples 39–48 in Tables 11 and 12 demonstrate the use of non-soy lecithin in low- and high-moisture gums that are sugar-free. Low-moisture gums have less than about 2% moisture, and high-moisture gums have greater than 2% moisture.

TABLE 10

|  | Ex. 23 | Ex. 24 | Ex. 25 | Ex. 26 | Ex. 27 |
|---|---|---|---|---|---|
| Base | 25.5 | 25.5 | 25.5 | 25.5 | 26.0 |
| Sorbitol | 50.85 | 50.7 | 50.5 | 50.0 | 48.0 |
| Mannitol | 12.0 | 12.0 | 12.0 | 12.0 | 13.0 |
| Glycerin | 10.0 | 10.0 | 10.0 | 10.0 | 10.0 |
| Flavor | 1.5 | 1.5 | 1.5 | 1.5 | 1.5 |
| Non-Soy Lecithin | 0.15 | 0.3 | 0.5 | 1.0 | 1.5 |

TABLE 11

|  | Ex. 28 | Ex. 29 | Ex. 30 | Ex. 31 | Ex. 32 |
|---|---|---|---|---|---|
| Base | 25.5 | 25.5 | 25.5 | 25.5 | 26.2 |
| Sorbitol | 50.95 | 50.8 | 50.5 | 51.9 | 49.8 |
| Sorbitol Liquid* | 10.0 | 10.0 | 10.0 | 10.0 | 11.0 |
| Mannitol | 10.0 | 10.0 | 10.0 | 10.0 | 10.0 |
| Glycerin | 2.0 | 2.0 | 2.0 | 0.0 | 0.0 |
| Flavor | 1.5 | 1.5 | 1.5 | 1.5 | 1.5 |
| Non-Soy Lecithin | 0.05 | 0.2 | 0.5 | 1.1 | 1.5 |

*Sorbitol liquid contains 70% sorbitol, 30% water.

TABLE 12

|  | Ex. 33 | Ex. 34 | Ex. 35 | Ex. 36 | Ex. 37 |
|---|---|---|---|---|---|
| Base | 25.5 | 25.5 | 25.5 | 25.5 | 26.0 |
| Sorbitol | 50.95 | 50.7 | 50.4 | 52.0 | 51.0 |
| HSH Syrup* | 10.0 | 10.0 | 10.0 | 10.0 | 10.0 |
| Mannitol | 8.0 | 8.0 | 8.0 | 8.0 | 9.0 |
| Glycerin** | 4.0 | 4.0 | 4.0 | 2.0 | 1.0 |
| Flavor | 1.5 | 1.5 | 1.5 | 1.5 | 1.5 |
| Non-Soy Lecithin | 0.05 | 0.32 | 0.65 | 1.0 | 1.5 |

*Lycasin brand hydrogenated starch hydrolyzate syrup.
**Glycerin and HSH syrup may be blended or co-evaporated.

Table 13 shows sugar chewing gum formulations that can be made with NSL and various types of sugars.

TABLE 13

|  | Ex. 38 | Ex. 39 | Ex. 40 | Ex. 41 | Ex. 42 | Ex. 43 | Ex. 44 |
|---|---|---|---|---|---|---|---|

TABLE 13-continued

|  |  |  |  |  |  |  |  |
|---|---|---|---|---|---|---|---|
| Gum Base | 19.2 | 19.2 | 19.2 | 19.2 | 19.2 | 19.2 | 19.2 |
| Sucrose | 49.4 | 48.5 | 44.4 | 43.5 | 34.4 | 43.5 | 34.4 |
| Glycerin | 1.4 | 1.4 | 1.4 | 1.4 | 1.4 | 1.4 | 1.4 |
| Corn Syrup | 14.0 | 14.0 | 14.0 | 14.0 | 14.0 | 14.0 | 14.0 |
| Dextrose | 5.0 | 5.0 | — | — | 10.0 | 5.0 | 10.0 |
| Lactose | 5.0 | 5.0 | 10.0 | 10.0 | — | — | — |
| Fructose | 5.0 | 5.0 | 10.0 | 10.0 | 10.0 | 5.0 | 10.0 |
| Invert Sugar | — | — | — | — | 10.0 | 10.0 | 10.0 |
| Maltose | — | — | — | — | — | — | — |
| Corn Syrup Solids | — | — | — | — | — | — | — |
| Peppermint Flavor | 0.9 | 0.9 | 0.9 | 0.9 | 0.9 | 0.9 | 0.9 |
| Non-Soy Lecithin | 0.1 | 1.0 | 0.1 | 1.0 | 0.1 | 1.0 | 0.1 |

|  | Ex. 45 | Ex. 46 | Ex. 47 | Ex. 48 | Ex. 49 | Ex. 50 | Ex. 51 |
|---|---|---|---|---|---|---|---|
| Gum Base | 19.2 | 19.2 | 19.2 | 19.2 | 19.2 | 19.2 | 19.2 |
| Sucrose | 43.5 | 34.4 | 43.5 | 42.4 | 46.5 | 42.4 | 36.5 |
| Glycerin | 1.4 | 1.4 | 1.4 | 1.4 | 1.4 | 6.4 | 6.4 |
| Corn Syrup | 14.0 | 14.0 | 14.0 | 11.0 | 11.0 | 11.0 | 11.0 |
| Dextrose | 5.0 | 10.0 | 5.0 | 10.0 | 5.0 | 5.0 | 5.0 |
| Lactose | — | — | — | — | — | — | — |
| Fructose | 5.0 | 10.0 | 5.0 | 5.0 | 5.0 | 5.0 | 5.0 |
| Invert Sugar | 10.0 | — | — | 5.0 | 5.0 | 5.0 | 5.0 |
| Maltose | — | 10.0 | 10.0 | — | — | — | — |
| Corn Syrup Solids | — | — | — | 5.0 | 5.0 | 5.0* | 10.0* |
| Peppermint Flavor | 0.9 | 0.9 | 0.9 | 0.9 | 0.9 | 0.9 | 0.9 |
| Non-Soy Lecithin | 1.0 | 0.1 | 1.0 | 0.1 | 1.0 | 0.1 | 1.0 |

*5-25DE maltodextrin can be used.

Table 14 shows chewing gum formulations that are free of sugar. These formulations can use a wide variety of other non-sugar alditols.

TABLE 14

(WEIGHT PERCENT)

|  | Ex. 52 | Ex. 53 | Ex. 54 | Ex. 55 | Ex. 56 | Ex. 57 |
|---|---|---|---|---|---|---|
| Gum Base | 25.5 | 25.5 | 25.5 | 25.5 | 25.5 | 25.5 |
| Glycerin | 2.0 | 2.0 | 2.0 | 2.0 | 2.0 | 2.0 |
| Sorbitol | 43.9 | 43.0 | 43.9 | 38.0 | 37.9 | 39.0 |
| Mannitol | — | 10.0 | 10.0 | 10.0 | 10.0 | 6.0 |
| Sorbitol Liquid | 17.0 | 17.0 | — | — | — | — |
| Lycasin | — | — | 17.0 | 12.0 | 8.0 | 10.0 |
| Maltitol | 10.0 | — | — | 10.0 | — | — |
| Xylitol | — | — | — | — | 15.0 | 15.0 |
| Lactitol | — | — | — | — | — | — |
| Palatinit | — | — | — | — | — | — |
| Flavor | 1.5 | 1.5 | 1.5 | 1.5 | 1.5 | 1.5 |
| Non-Soy Lecithin | 0.1 | 1.0 | 0.1 | 1.0 | 0.1 | 1.0 |

|  | Ex. 58 | Ex. 59 | Ex. 60 | Ex. 61 | Ex. 62 | Ex. 63 |
|---|---|---|---|---|---|---|
| Gum Base | 25.5 | 25.5 | 25.5 | 25.5 | 25.5 | 25.5 |
| Glycerin | 8.0 | 8.0 | 8.0 | 2.0 | 1.0 | 0.0 |
| Sorbitol | 41.9 | 36.0 | 31.9 | 40.0 | 26.9 | 21.0 |
| Mannitol | 8.0 | 8.0 | 8.0 | — | — | — |
| Sorbitol Liquid | 5.0 | — | — | — | — | — |
| Lycasin | — | 5.0 | 5.0 | 5.0 | 10.0 | 10.0 |
| Maltitol | — | 5.0 | — | — | — | — |
| Xylitol | — | — | — | 15.0 | 10.0 | 20.0 |
| Lactitol | 10.0 | 10.0 | 10.0 | — | — | — |
| Palatinit | — | — | 10.0 | 10.0 | 25.0 | 21.0 |
| Flavor | 1.5 | 1.5 | 1.5 | 1.5 | 1.5 | 1.5 |
| Non-Soy Lecithin | 0.1 | 1.0 | 0.1 | 1.0 | 0.1 | 1.0 |

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A gum base comprising at least approximately 1.0% by weight of a non-soy liquid lecithin composition.

2. The gum base of claim 1 wherein the non-soy liquid lecithin comprises approximately 1 to about 13 by weight of the composition.

3. The gum base of claim 1 wherein the gum base includes powdered lecithin.

4. The gum base of claim 1 comprising waxes that are predominantly composed of iso-alkanes.

5. The gum base of claim 1 wherein the lecithin does not include phosphatidyl ethanolamine.

6. The gum base of claim 1 wherein the lecithin includes a modified phosphatide.

7. The gum base of claim 1 including a modified phosphatide having the structure:

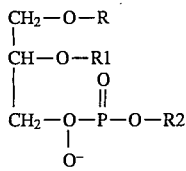

wherein

R= a fatty acid

R1= a fatty acid or an optional side-chain identical to the structures of any R2

R2= a primary side-chain the same as or different from R1 and having a structure:

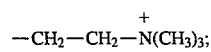

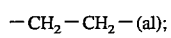

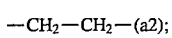

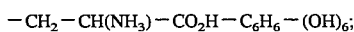

and

—H; and wherein a1 and a2 are secondary, tertiary or quaternary amines of the optional and primary side chains R1 and R2, respectively, a1 and a2 each having identical or different structures from one another, the structures being one or more of

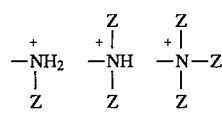

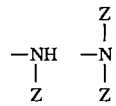

wherein each Z is one or more substituted side chains that is the same as or different from each other, the side chains being other than —CH$_3$ and

and being side chains that inhibit a carbonyl reaction of a saccharide to an amine.

8. The gum base of claim 1 wherein the non-soy liquid lecithin includes an oil chosen from the group consisting of corn and palm oil.

9. The gum base of claim 1 includes at least one softener chosen from the group consisting of monohydrogenated, partially hydrogenated, and fully hydrogenated glycerides chosen from the group consisting of cottonseed, palm, palm kernel, coconut, safflower, and tallow.

10. The gum base of claim 1 including at least one petroleum wax having a number average molecular weight of at least 600 and a viscosity of at 10 mm$^2$/s.

11. A gum base comprising:

a wax compound that comprises less than 50% alkanes having a carbon length of less than C-30; and non-soy lecithin comprising approximately 0.1 to about 13% by weight.

12. The gum base of claim 11 wherein the non-soy lecithin is powdered.

13. The gum base of claim 11 wherein the non-soy lecithin does not include phosphatidyl ethanolamine.

14. The gum base of claim 11 wherein the non-soy lecithin includes a modified phosphatide.

15. The gum base of claim 11 including a modified phosphatide having the structure:

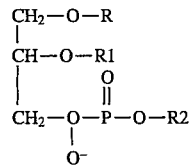

wherein

R= a fatty acid

R1= a fatty acid or an optional side-chain identical to the structures of any R2

R2= a primary side-chain the same as or different from R1 and having a structure:

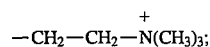

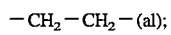

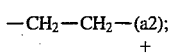

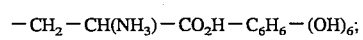

and

—H; and wherein a1 and a2 are secondary, tertiary or quaternary amines of the optional and primary side chains R1 and R2, respectively, a1 and a2 each having identical or different structures from one another, the structures being one or more of

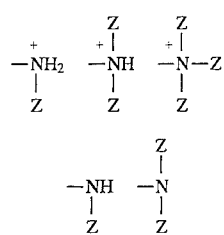

wherein each Z is one or more substituted side chains that is the same as or different from each other, the side chains being other than —CH₃ and

and being side chains that inhibit a carbonyl reaction of a saccharide to an amine.

16. The gum base of claim 11 wherein the wax is predominantly composed of iso-alkanes.

17. A method for improving flavor in a chewing gum comprising the steps of manufacturing chewing gum from a gum base that includes at least 0.1% by weight non-soy lecithin and does not include soybean oil.

18. A gum base comprising at least 0.1% by weight of a corn oil base lecithin.

19. A chewing gum having improved flavor comprising:
a water soluble portion;
one or more flavors;
a water insoluble base; and
at least 1.0% by weight of a non-soy liquid lecithin.

20. A chewing gum having improved flavor comprising:
a water soluble portion;
one or more flavors; and
a water insoluble portion including petroleum having at least 50% alkanes having a carbon length of C-30 or greater, and at least 0.1% by weight of a non-soy lecithin.

* * * * *